(12) United States Patent
Lehane

(10) Patent No.: US 9,313,339 B2
(45) Date of Patent: Apr. 12, 2016

(54) SYSTEM AND METHOD FOR PROVIDING DETECTION OF SIGNALING-ONLY ENGAGEMENTS IN A TELECOMMUNICATION NETWORK

(71) Applicant: OPENET TELECOM LTD., Dublin (IE)

(72) Inventor: Bart Lehane, Dublin (IE)

(73) Assignee: Openet Telecom, LTD., Dublin (IE)

( * ) Notice: Subject to any disclaimer, the term of this patent is extended or adjusted under 35 U.S.C. 154(b) by 0 days.

(21) Appl. No.: 14/807,208

(22) Filed: Jul. 23, 2015

(65) Prior Publication Data
US 2015/0326736 A1 Nov. 12, 2015

Related U.S. Application Data

(63) Continuation of application No. 13/956,828, filed on Aug. 1, 2013, now Pat. No. 9,125,076.

(60) Provisional application No. 61/678,711, filed on Aug. 2, 2012.

(51) Int. Cl.
*H04W 4/00* (2009.01)
*H04M 1/66* (2006.01)
(Continued)

(52) U.S. Cl.
CPC ............ *H04M 15/12* (2013.01); *H04M 15/725* (2013.01); *H04W 4/005* (2013.01); *H04W 4/24* (2013.01); *H04W 12/08* (2013.01); *H04W 24/02* (2013.01); *H04M 15/24* (2013.01)

(58) Field of Classification Search
CPC ....... H04W 4/005; H04W 4/06; H04W 12/06; H04L 63/08
USPC ................ 455/411, 423–425, 433, 434, 435.1
See application file for complete search history.

(56) References Cited

U.S. PATENT DOCUMENTS 8,638,724 B1 * 1/2014 Knoop .................... H04L 69/22
370/235

2011/0128911 A1 * 6/2011 Shaheen ............... H04L 63/104
370/328

(Continued)

FOREIGN PATENT DOCUMENTS

EP 2096884 A1 9/2009
EP 2395811 A1 12/2011
(Continued)

OTHER PUBLICATIONS

3GPP TR 23.888, Technical Report, 3rd Generation Partnership Project; Technical Specification Group Services and System Aspects; System Improvements for Machine-Type Communications (Release 11), V1.4.0, Aug. 2011.

(Continued)

*Primary Examiner* — Dung Hong
(74) *Attorney, Agent, or Firm* — The Marbury Law Group, PLLC

(57) ABSTRACT

A network server may be configured to prevent user equipment (UE) from communicating payload information across a telecommunication network without paying for the access or use of the network. This may be accomplished by the network server receiving signaling information relating to the UE from a first network component, receiving data plane information relating to the UE from a second network component, using the received information to determine a ratio between the number of signaling-only connections and the average monthly revenue associated with the user equipment device, determining whether the UE is a signaling-only device based on the ratio, and performing a responsive operation when it is determined that the user equipment device is a signaling-only device. The responsive operation may include applying a policy or charging rule to the signaling communications of the UE when it is determined that the UE is a signaling-only device.

18 Claims, 5 Drawing Sheets

(51) Int. Cl.
- *H04W 24/00* (2009.01)
- *H04M 15/12* (2006.01)
- *H04M 15/00* (2006.01)
- *H04W 4/24* (2009.01)
- *H04W 24/02* (2009.01)
- *H04W 12/08* (2009.01)
- *H04M 15/24* (2006.01)

(56) References Cited

U.S. PATENT DOCUMENTS

| | | |
|---|---|---|
| 2011/0199905 A1 | 8/2011 | Pinheiro et al. |
| 2012/0087274 A1* | 4/2012 | Meriau .............. H04W 4/00 370/253 |
| 2012/0164954 A1 | 6/2012 | Karampatsis et al. |
| 2014/0050147 A1 | 2/2014 | Beale |
| 2014/0056222 A1 | 2/2014 | Zhu et al. |
| 2014/0089442 A1 | 3/2014 | Kim et al. |

FOREIGN PATENT DOCUMENTS

| | | |
|---|---|---|
| WO | 2011006768 A1 | 1/2011 |
| WO | 2011095618 A1 | 8/2011 |
| WO | 2011134329 A1 | 11/2011 |

OTHER PUBLICATIONS

European Search Report, EP Application No. 13179192, Feb. 10, 2014.

European Search Report, EP Application No. 13179193, Feb. 10, 2014.

European Search Report, EP Application No. 13179194, Feb. 10, 2014.

Huawei, 'Network Improvement for Group Based Charging', 3GPP TSG SA WG2 Meeting #78, Feb. 22-26, 2010, San Francisco, USA.

Juniper Networks, 'Solution for Group based Charging/policing/addressing', SA WG2 Meeting #91, May 21-25, 2012, Kyoto Japan.

MediaTek Inc., 'MTC small data Identification mechanism for non-SMS Small Data Transmission Solution', SA WG2 Meeting #87, Oct. 10-14, 2011, Jeju Island, South Korea.

Zte, 'Transmission of Small IP Packets', 3GPP SA WG2 Meeting #92, Jul. 9-13, 2012, Barcelona Spain.

* cited by examiner

SYSTEM AND METHOD FOR PROVIDING DETECTION OF SIGNALING-ONLY ENGAGEMENTS IN A TELECOMMUNICATION NETWORK

RELATED APPLICATIONS

This application is a continuation of U.S. patent application Ser. No. 13/956,828, which claims the benefit of priority to U.S. Provisional Application No. 61/678,711, titled "System and Method for Providing Machine-To-Machine Engagements with Cellular Wireless Networks" filed Aug. 2, 2012, and is related to U.S. application Ser. No. 13/957,361 titled "System and Method for Controlling Advanced Triggering Operations in a Telecommunication Network," which also claims the benefit of priority to U.S. Provisional Application No. 61/678,711, entire contents of all of which are hereby incorporated by reference.

BACKGROUND

Telecommunications networks have seen very rapid advances in their numbers of users and the types of services available. In particular, the combination of data-orientated mobile telecommunications networks (e.g., 3G, 4G, LTE, Wi-Fi, etc.) and feature rich smart phones and tablet devices has enabled users to consume a greater variety of services. As more users utilize these services, telecommunication system operator networks must expand to meet the increase in user demand, support the array of new services and provide fast, reliable communications. This expansion has greatly increased the complexity of wireless and cellular networks, and the efficient management of network traffic is becoming an ever more challenging task.

Another recent development within the computing and telecommunications industries has been the proliferation of mobile devices that are capable of performing Machine-to-Machine (M2M) communications. Such devices may communicate and interact with other devices to accomplish a variety of tasks, all without any direct involvement of human users or operators. Yet, unlike conventional M2M devices, mobile M2M capable devices are not always tethered to the network via physical connection. Rather, these devices may communicate using wireless or the cellular telephone networks, such as 3G, 4G, LTE and UMTS networks.

As M2M capable devices continue to grow in popularity and use, telecommunication network providers must develop improved solutions for managing the increases in network traffic caused by the use of such devices. Therefore, improved solutions for managing the traffic characteristics of M2M devices, ensuring efficient traffic flow, avoiding network congestion, and allowing for the proper compensation of the telecommunication network operators/providers for the use of their networks by M2M devices will be beneficial to consumer and telecommunication network operators.

SUMMARY

The various aspects include methods of preventing a user equipment device from communicating payload information in a telecommunication network without sufficiently paying for use of the telecommunication network, which may include receiving in a processor signaling information relating to the user equipment device from a first network component in the telecommunication network, receiving in the processor data plane information relating to the user equipment device from a second network component in the telecommunication network, determining whether the user equipment device is a signaling-only device based on the received signaling information and the received data plane information, and performing a responsive operation when it is determined that the user equipment device is a signaling-only device.

In an embodiment, the method may include receiving in the processor subscriber information relating to the user equipment device from a third network component in the telecommunication network, and determining whether the user equipment device is a signaling-only device includes determining whether the user equipment device is a signaling-only device based on the received signaling information, the received data plane information, and the received subscriber information.

In an embodiment, performing a responsive operation may include applying a policy rule to signaling communications of the user equipment device in response to determining that the user equipment device is a signaling-only device. In a further embodiment, applying the policy rule to the signaling communications of the user equipment device may include blocking the signaling communications of the user equipment device.

In a further embodiment, performing a responsive operation may include applying a charging rule to the signaling communications of the user equipment device. In a further embodiment, performing the responsive operation may include sending a notification message to a component in the telecommunication network to notify the component that the user equipment device is a signaling-only device in response to determining that the user equipment device is a signaling-only device.

In a further embodiment, receiving signaling information relating to the user equipment device from the first network component in the telecommunication network includes receiving signaling information obtained via an application level protocol.

In a further embodiment, receiving signaling information relating to the user equipment device from the first network component includes receiving information regarding a proxied signaling communication. In a further embodiment, receiving signaling information relating to the user equipment device includes receiving information identifying a communication group of the user equipment device. In a further embodiment, receiving signaling information relating to the user equipment device from the first network component includes receiving signaling information from a mobility management entity (MME) component.

In a further embodiment, receiving data plane information relating to the user equipment device from the second network component includes receiving the data plane information from one of an eNodeB, serving gateway (SGW), packet data network gateway (PGW), policy charging rules function (PCRF) component, on-line charging system (OCS) component, and an offline charging system (OFCS) component.

In a further embodiment, receiving subscriber information relating to the user equipment device from the third network component includes receiving the subscriber information from a home subscriber server (HSS). In a further embodiment, determining whether the user equipment device is a signaling-only device based on the received signaling information and the received data plane information includes computing a ratio between connections in which no payload information was transmitted and connections in which payload information was transmitted. In a further embodiment, receiving signaling information relating to the user equipment device from a first network component in the telecommunication network includes receiving SS7 or IMS signaling information.

Further embodiments include a server computing device having a processor configured with processor-executable instructions to perform various operations corresponding to the methods discussed above.

Further embodiments include a non-transitory processor-readable storage medium having stored thereon processor-executable instructions configured to cause a processor to perform various operations corresponding to the method operations discussed above

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
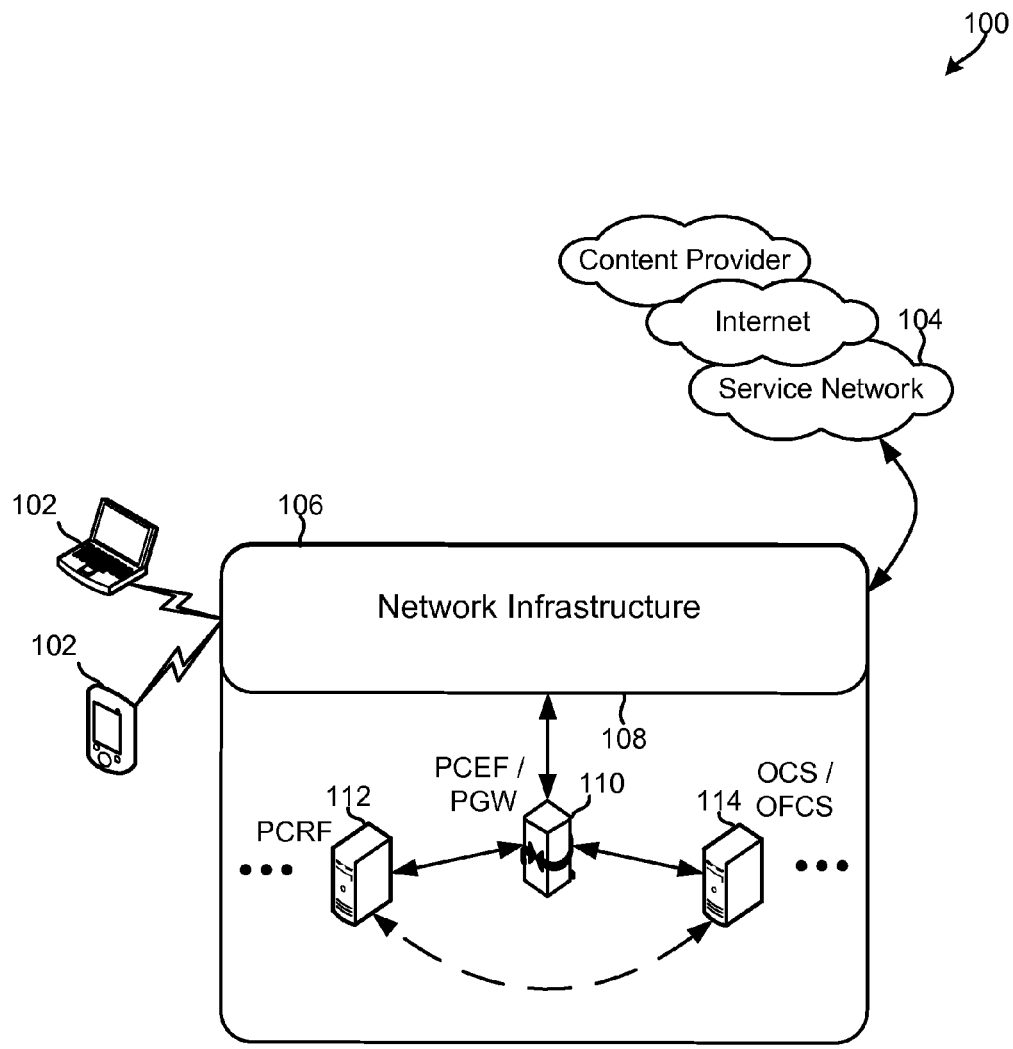
FIG. 1 is a system block diagram illustrating network components of a communication system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, as well as server computing devices configured with processor-executable instructions to implement the methods, of preventing a user equipment device from communicating payload information (e.g., information that is normally chargeable or counted against a usage balance or limit) across a telecommunication network without sufficiently paying for the access or use of the network. This may be accomplished by receiving signaling, data plane, and/or subscriber information relating to a user equipment device from various components in the network, using the received information to determine whether a user equipment device is operating as a signaling-only device, and applying a policy rule to signaling communications of the user equipment device when it is determined that the user equipment device is operating as a signaling-only device. The policy rule may be a charging rule that bills the subscriber account of the user equipment device, or a rule that blocks or restricts the user equipment device's access to the network.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a single process and/or thread of execution. A component may be localized on one processor or core, or distributed between two or more processors or cores. In addition, components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

The term "user equipment (UE)" is used herein to refer to any electronic device capable of sending and receiving wireless communication signals. A user equipment device typically includes a programmable processor, a memory, and communication circuitry suitable for sending and receiving information to and from a cellular telephone communications network.

The phrase "signaling-only device" is used herein to refer to any component that communicates substantive payload information via signaling communications, generates a large amount or percentage of signaling or control plane information relative to content or data plane information, or otherwise uses signaling communications to circumvent paying for the full use of a communications network. For example, a signaling-only device may circumvent paying for the full use of the network by embedding payload information in signaling messages, generating signaling communications in patterns, detecting and interpreting patterns in signaling communications, inferring information from detected signaling patterns, or by performing other similar operations.

In recent years, there has been an increase in the popularity and use of machine-to-machine (herein "M2M") user equipment devices. M2M devices may be user equipment devices that communicate and interact with other M2M devices, servers and/or components to accomplish a task without the direct involvement of human users or operators. These devices often communicate via wireless or the cellular telephone communications networks, and thus create new challenges for telecommunication service providers and network operators (herein collectively "network operators"). For example, an increase in M2M communications may cause an increase in network traffic and congestion from signaling communications that do not generate additional revenue for the network operator.

To meet current demands and the expected future increases in network traffic from the increase in the number and use of M2M devices, network operators may be required to update their networks and/or the policies by which M2M devices are allowed to access and use their networks/services. However, it is often challenging to determine which user equipment devices are operating as M2M devices by performing a significant amount or volume of machine-to-machine transactions or communications. It also challenging to determine which user equipment devices that are operating as M2M devices are further operating as signaling-only devices by communicating substantive payload information via signaling communications.

Different sources of M2M communications and network signaling traffic may exhibit characteristics that are different from one another. The characteristics of these communications and the network traffic generated by M2M devices are also different than those generated by conventional user equipment devices and network components. These varying characteristics may make it more challenging for the network operator to determine whether a user equipment device is a conventional device or a signaling-only device that is communicating payload information via signaling communications, and thus causing an increase in network traffic without generating additional revenues for the network operator.

The various embodiments include components configured to efficiently determine whether a user equipment device is a signaling-only device, and thus allow network operators to charge an appropriate fee for the access and use of their networks by such devices. The various embodiments also include components configured to allow network operators to better manage the unique traffic characteristics of signaling-only devices, ensure efficient traffic flow, and avoid excessive network congestion from signaling communications generated by these devices.

Often, M2M user equipment devices may accomplish many of the functionalities for which they are designed or configured by communicating a small amount of information across the network. For example, an M2M device may be designed or configured to monitor and report the status of a component or condition, such as a vending machine reporting whether it needs to be refilled, a bin reporting how full it is, a temperature sensor reporting the temperature, etc. Since only a small amount of information is communicated by these devices, it is possible for these devices to transmit the required information via signaling (i.e., control plane) communications as opposed to content (i.e., data plane) communications.

Many mobile and wireless communication networks do not count signaling communications (i.e., the information used to connect a device to the network, set up a data sessions, start a phone call, etc.) against a subscriber's data limit or balance. That is, many networks only charge their users/subscribers for content communications, such as data or user plane communications that carry a data payload, voice signals, etc. Therefore, the use of signaling communications to transmit payload information (data, voice, etc.) by these devices may lead to an increase in network traffic, without resulting in an increase in revenue for the network operators.

An example of a signaling-only user equipment device is a sensor on a vending machine that reports to a third party system whether the vending machine needs to be refilled. In this example, the information that needs to be reported is either "refill_required" or "no_refill_required," which could be communicated in a few bits. Rather than sending this data in a content message or over the data plane, the sensor can simply turn on at a certain time to indicate its status. The sensor may turn on and off at 8 A.M. to indicate that the status is "refill_required," or at 9 A.M. to indicate that the status is "no_refill_required." The third party system only needs to obtain a record of when a device last connected (or connects) to the network, and such information is readily available to the third party system via device management interfaces. The same results may be achieved when a sensor dials a number at a certain time (e.g., using SS7 signaling), but the third party application never answers the call.

This concept can be extended to more complex schemes reporting even more information. For example, if the vending machine sensor wants to report a percentage value (e.g., 20% full, etc.) rather than a binary value (e.g., refill_required or no_refill_required), then it can again turn on at a specific time to generate a pattern that is known to the third party system. For instance, the third party system and the sensor may implement a signaling scheme in which the third party system interprets the sensor turning on at 10 minutes past the hour as meaning that the vending machine is 10/60=17% full. If the sensor turns on at 51 minutes past the hour, then the third party system may interpret this to mean the vending machine is 51/60=85% full. All such information may be communicated across the network using signaling communications, which increases network traffic but does not generate additional revenue for the network operators.

In addition, M2M devices may include payload information in signaling messages to avoid paying for the access or use of the network. For example, network components may use the Session Initiation Protocol (SIP) to create and tear down sessions. It is relatively simple for a SIP application in an M2M device to add in custom headers to certain messages (e.g., SIP INVITE message) to communicate information about the underlying service in a signaling message. For example, a SIP application in a M2M device may be configured to add a custom header (e.g., "Application-status: 40") to a "SIP INVITE" signaling message, and the M2M device may transmit this message as part of a false attempt to establish a content call or communication link with a receiving device (e.g., a server, etc.). The receiving device may be configured to automatically reject the content call, and use the information ("Application-status: 40") included in the signaling (e.g., SIP INVITE) message, such as by querying a status lookup table with the value "40" to determine that the status of the M2M device is "ready." In this example, no content call or data plane communication link is established because the receiving device rejects the call. Yet, the M2M device is able to communicate substantive payload information (i.e., its status) to the receiving device, and since many network operators do not charge their subscribers for such signaling communications, the M2M device may avoid paying for the access or use of the network.

Similarly, the M2M device and/or SIP application may modify an existing header field in a SIP message (e.g., SIP INVITE message) to contain additional information. For example, a "User-Agent" field may be modified to include information relating to a temperature reading. In this manner, the M2M device may communicate payload information (e.g., the temperature reading) in the SIP signaling message and avoid paying for the access or use of the network.

Various embodiments may include a network component (e.g., server, etc.) configured to determine whether a user equipment device is an M2M or signaling-only device that is only (or primarily) generating signaling communications or otherwise circumventing the billing and/or charging systems of the network. The network component may also be configured to perform various operations to better manage communications generated by M2M or signaling-only devices and/or to bill or charge a subscriber account associated with such devices for the access and use of the network. For example, the network component may be configured to block all communications originating from the signaling-only device, identify and bill or charge the owners/users of the signaling-only device for the signaling traffic generated by their devices, notify the network operator or device owner of the improper use of the network by their device, apply targeted policies to user equipment devices determined to be signaling-only devices, and/or perform other similar operations to better manage or generate revenue from the signaling communications generated by such devices.

In an embodiment, the network component may be configured to determine whether the user equipment device is a signaling-only device by monitoring signaling communications in the network. For example, to connect the device to the network in a 3GPP EPC environment, signaling communications may pass through any or all of an eNodeB, mobility management entity (MME) component, serving gateway (SGW), packet data network gateway (PGW), policy charging rules function (PCRF) component, on-line charging system (OCS), off-line charging system (OFCS), and home subscriber server (HSS). When deployed in such an environment, the network component may be configured to use information obtained from or stored in any or all of these components/nodes to determine whether a user equipment device is a signaling-only device.

In an embodiment, the network component may be configured to obtain data plane traffic information from any or all of the eNodeB, SGW, PGW, PCRF, OCS, and OFCS, and use such information to determine whether the amount of data plane traffic (e.g., content messages) generated by the device corresponds or is proportional to the amount of control plane traffic (e.g., signaling message) generated by that device. The network component may be configured to determine whether a device is a signaling-only device by using information from both the signaling/control plane communications and the content/data plane communications. For example, the network component may be configured to determine when a device is consistently creating signaling traffic without sufficient data traffic, and label or classify such a device as being a signaling-only device. The network component may also be configured to collate signaling and data plane information from the various nodes in the network to determine whether a device is a signaling-only device. The network component may also be configured to use subscriber information received from a HSS component to determine whether a user equipment device is a M2M signaling-only device.

In an embodiment, the network component may be a logical signaling-only device detector (SODD) component or node. The SODD component may be included in a M2M engagement engine (MEE) or in an existing network component or node (e.g., PGW, SGW, PCRF, etc.). In an embodiment, the SODD component may be implemented as a standalone component (e.g., in an independent server computing device, etc.) that is configured to communicate with the other components (e.g., OCS, PCRF, HSS, etc.) in the telecommunication network.

Generally, there are two broad categories of signaling communications: direct and proxied. In various embodiments, the network component may be configured to determine whether a device is a signaling-only device by detecting and/or evaluating direct signaling communications, proxied signaling communications, or both.

A direct signaling communication occurs when an M2M device communicates directly with an M2M application server. For example, a direct signaling communication occurs when an M2M device phones a specific number to convey information to an M2M application server. For example, the M2M application server may have multiple phone numbers, and each phone number may represent a specific state of the M2M device. The M2M application server may be configured to detect the caller identity for each incoming call, reject the call, and use the caller identity to determine the status of the M2M device. For example, in the context of a bin collection service, the phone numbers xxx-xx50, xxx-xx75, and xxx-xx90 might be used to indicate that the bins are 50%, 75%, and 90% full respectively. A direct signaling communication also occurs when an M2M device phones a general number at a specific time to convey information. The M2M device in a bin may place a call at a specific time to indicate its state. For example, a call at half past any hour may indicate that it is 50% full, and a call at three quarters past the hour may indicate that it is 75% full.

A proxied signaling communication occurs when an M2M device causes a component in the network to communicate with the M2M application server on its behalf. For example, a proxied signaling communication occurs when an M2M device turns on at a certain time to control when the network reports it as being "last seen." Since many network operators enable the M2M application server to query the mobile phone network to determine M2M device attributes, such as when it was last connected to the mobile phone network, the M2M device can connect only at specific times to communicate its state. As another example, a proxied signaling communication occurs when a M2M device adds information to a SIP header.

As a further example, a proxied signaling communication occurs when an M2M device encodes the information to be communicated in DNS requests. That is, in some mobile phone networks, DNS requests to the operator's DNS server are zero rated (i.e., free). Therefore, the M2M device may request DNS lookups for non-existent sub-domain names that contain the information to be communicated. For example, the domain name d113-t24-h60.my-server.com may be used to indicate that device 113 has a temperature reading of 24 C and a humidity reading of 60%. In addition, each subdomain may contain some unique characters to unsure that the domain name is not cached, e.g., the data and time. In order to resolve this, the operator's DNS server may pass this domain name to a DNS server under the control of the M2M service provider. At this point, the M2M service provider may extract the information from the subdomain.

In an embodiment, the network component may be configured to determine whether a user equipment device is a signaling-only device by detecting and/or evaluating both direct and proxied signaling communications. The network component may also be configured to receive data plane, signaling, and/or subscriber information from nodes in the mobile phone network operator's network, and determine whether a device is a signaling only device based on the received signaling, data plane, and/or subscriber information. In various embodiments, the network component may be configured to allow or block some or all of the signaling communications, update subscriber information, and/or apply policy or charging rules when it determines that a device is a signaling-only device.

The various embodiments may be implemented within a variety of communication systems, an example of which is illustrated in FIG. 1. A typical communication system 100 includes user equipment 102 configured to send and receive voice, data, and control signals to and from a service network 104 (and ultimately the Internet and/or a content provider) via a communications network 106.

In the example illustrated in FIG. 1, the communications network 106 includes a network infrastructure 108 unit that encapsulates various network components or systems, each of which may implement any of a variety of communication technologies/protocols to process and route the voice, data and control signals to and from the user equipment 102. For example, the network infrastructure 108 unit may include components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 unit may include connections to a policy control enforcement function (PCEF) component 110, which may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules.

The PCEF component 110 may also be configured to send signaling information (e.g., control plane information relating to communication setup, security, authentication, charging, enforcement of policy rules, etc.) to a policy control rules function (PCRF) component 112, online/offline charging systems (OCS/OFCS) 114, and other similar components that participate in, collect information from, or otherwise contribute to, communications between the service network 104 and the user equipment 102.

The components 110, 112, 114 may communicate using a standardized protocol, such as the Diameter protocol, remote authentication dial in user service (RADIUS) protocol, or any other protocol. For example, the components 110, 112, 114 may communicate using the Diameter protocol, which is an extensible protocol that provides a general mechanism for two or more components/nodes in a network to communicate signaling information (e.g., communications involving call setup, security, authentication, charging, enforcement of policy rules).

Figure 2:
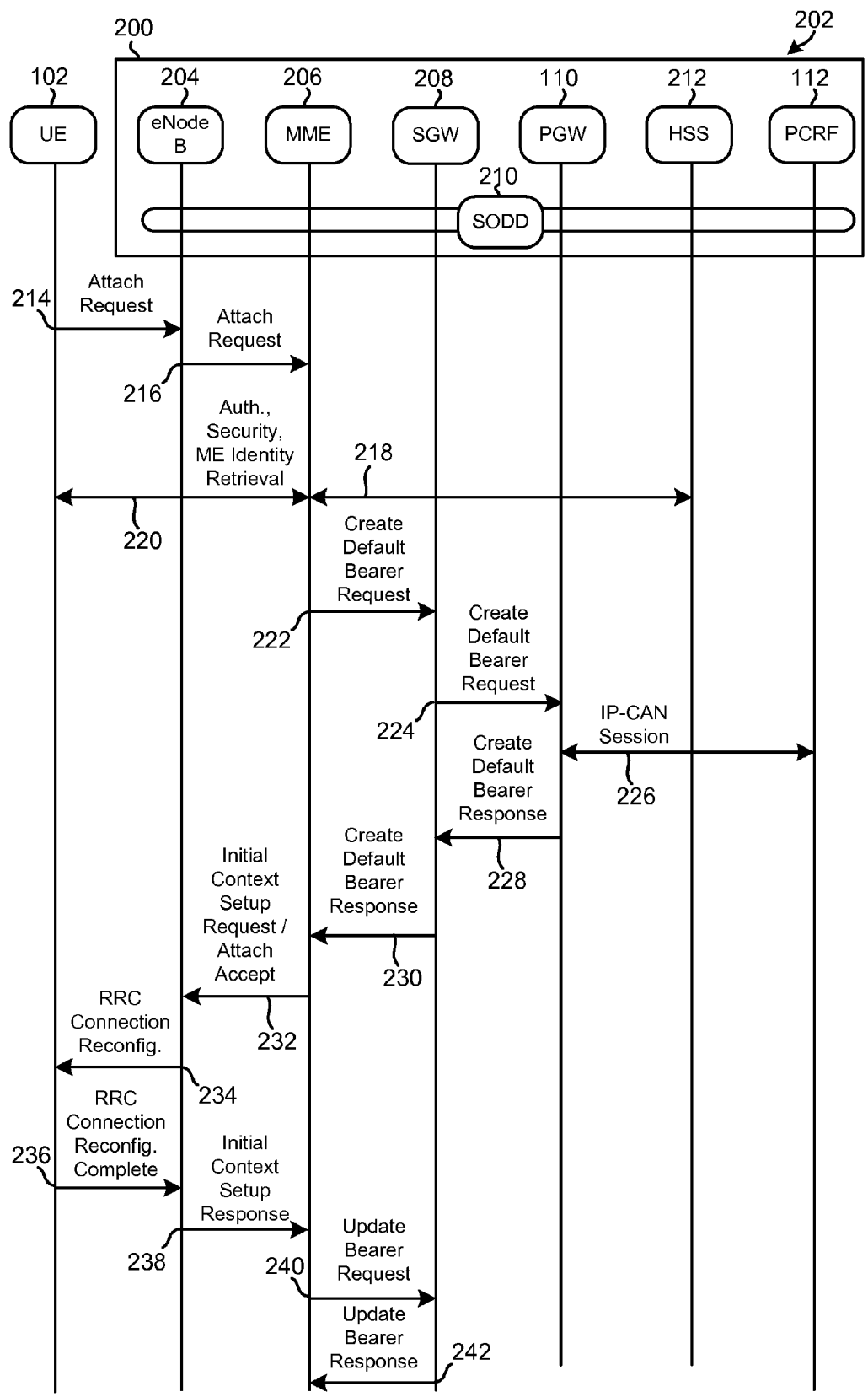
FIG. 2 is a call flow diagram illustrating example signaling communications and interactions that occur between various network components when performing network connection operations that may be used by the various embodiments to determine whether a user equipment device is a signaling-only device.

FIG. 2 illustrates example signaling communications and interactions that may occur between components in an LTE/EPC network 200 when performing a network connection method 202 to establish a communication link between user equipment 102 and the network 200. The network 200 may include an eNodeB 204, an MME 206 component, a SGW 208 component, a PGW 110 component, a HSS 212 component, and a PCRF 112 component. The network 200 may also include a signaling-only device detector (SODD) 210 component, which may be configured to query any or all of the nodes/components 110, 112, 204, 206, 208, 212 in the network 200 to determine when the user equipment 102 device requests or establishes a connection to the network 200. The SODD 210 component may also be configured to identify or detect patterns in the signaling communications discussed below with reference to operations 214-242 to determine whether the user equipment 102 device is a signaling-only device.

In operation 214 of method 202, the user equipment 102 may send an "attach request" signaling message to the eNodeB 204. In operation 216, the eNodeB 204 may forward the "attach request" signaling message to the MME 206 component. In operation 218, the MME 206 component may request and receive user and subscription information from the HSS 212 component by sending and receiving signaling messages. In operation 220, the MME 206 component may communicate with the user equipment 102 device via signaling communications to perform various security, authentication, identification, and/or administrative tasks (e.g., user authentication, enforcement of roaming restrictions, etc.). In operation 222, the MME 206 component may identify and select a suitable SGW 208 component, generate a "create default bearer request" signaling message that includes a transport layer address and tunnel endpoint, and send signaling messages to the selected SGW 208 component. The signaling messages may include the "create default bearer request" message and various other administrative and/or authorization information.

In operation 224, the SGW 208 component may receive the "create default bearer request" signaling message, store information about the access request (e.g., parameters of the requested IP bearer service, network internal routing information, etc.) and forward the received signaling message to a PCEF/PGW 110 component. In operation 226, the PCEF/PGW 110 component may send and receive signaling information to and from the PCRF 112 component, and create an Internet Protocol Connectivity Access Network (IP-CAN) session. Also in operation 226, the PCRF 112 component may access subscriber databases, interact with online/offline charging systems 114 via a signaling communication, create policy rules, and send the policy rules to the PCEF/PGW 110 for enforcement via a signaling communication.

In operation 228, the PCEF/PGW 110 component may send a "create default bearer response" signaling message to the SGW 208 component. The "create default bearer response" signaling message may include quality of service (QoS) parameters, identify the termination of the bearer, and include other similar information. In operation 230, the SGW 208 component may forward the "create default bearer response" signaling message to the MME 206 component. In operation 232, the MME 206 component may send context information, an "initial context setup request" signaling message and/or an "attach accept" signaling message to the eNodeB 204. In operation 234, the eNodeB 204 performs various radio resource control (RRC) reconfiguration and/or radio resource management (RRM) operations, such as creating a context for the user equipment 102, performing radio bearer reconfiguration operations, allocating resources, controlling radio interfaces, determining an access priory for the user equipment 102 based on quality of service (QoS) requirements, and sending information to the user equipment 102 device via signaling communications.

In operation 236, the user equipment 102 device may send a "RRC connection reconfiguration complete" signaling message to the eNodeB 204. Also in operation 236, the eNodeB 204 and/or user equipment 102 device may setup the initial context and connection between the user equipment 102 device and the network 200. In operation 238, the eNodeB 204 may send an "initial context setup response" signaling message to the MME 206 component. In operation 240, the MME 206 component may send an "update bearer request" signaling message to the SGW 208 component. In operation 242, the SGW 208 component may send an "update bearer response" signaling message to the MME 206 component.

The SODD 210 component may be configured to use any or all of the signaling communication discussed above with reference to operations 214-242 to determine when a user equipment 102 device has requested or established a connection to the network. Further, since data traffic flows from the user equipment 102 through the eNodeB 204, SGW 208, and PGW 110 components, the SODD 210 component may be configured to obtain and use information obtained from these nodes/components 102, 204, 208, 110 to monitor the amount of data generated by the user equipment 102 device. The SODD 210 component may also be configured to obtain and use information from the PCRF 112 component and/or an OCS 114 component (not illustrated in FIG. 2) to monitor or track the usage of data by the user equipment 102 device. That is, the SODD 210 component may be configured to determine the amount of data used or generated by the user equipment 102 device by querying any or all of the nodes/components 110, 112, 204, 206, 208, 212 in the network 200.

Figure 3:
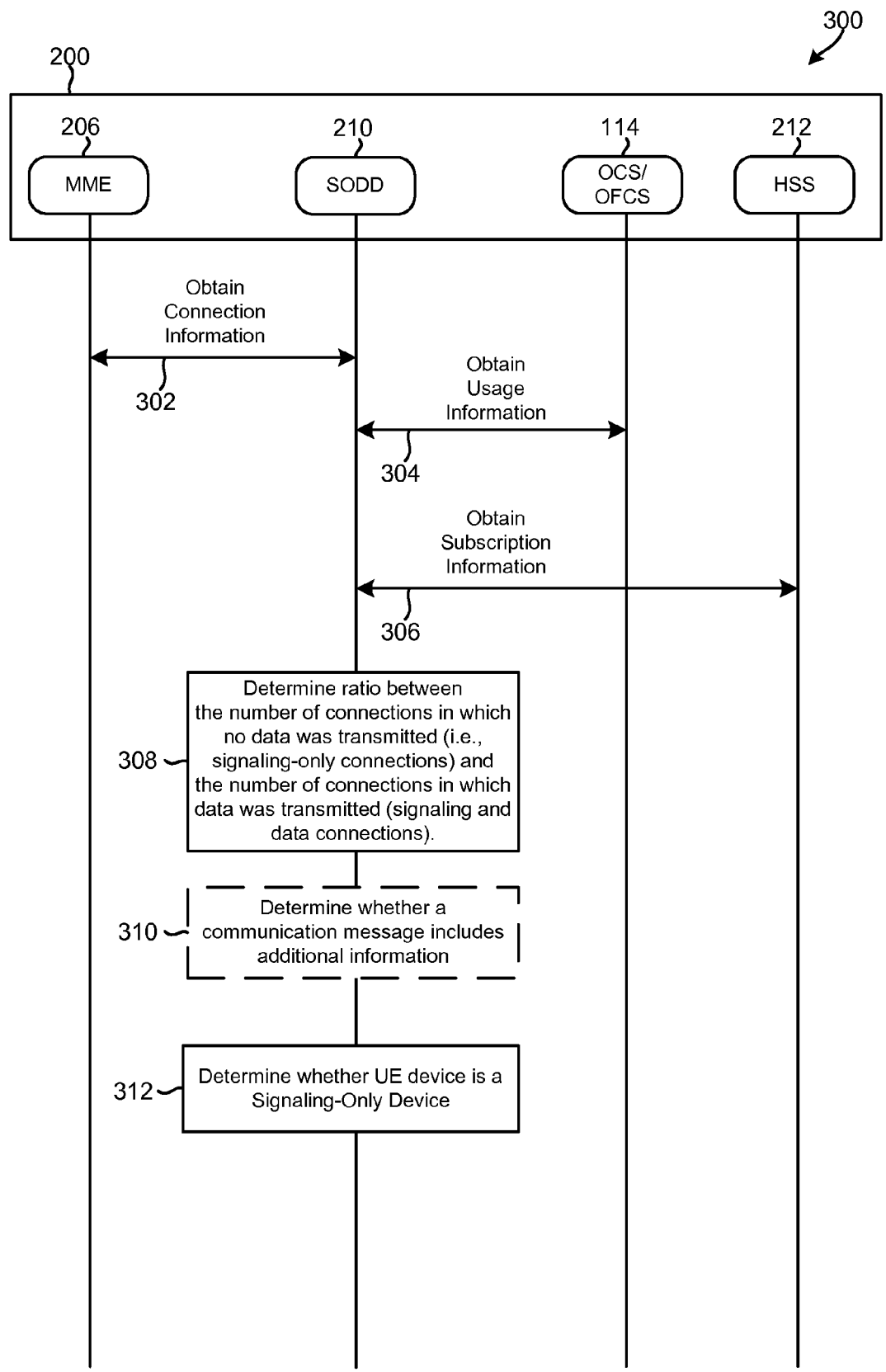
FIG. 3 is a call flow diagram illustrating an embodiment method of receiving information from various network components to determine whether a user equipment device is a signaling-only device.

FIG. 3 illustrates an embodiment method 300 of determining whether a user equipment 102 device is a signaling-only device. In the example illustrated in FIG. 3, the network 200 includes a SODD 210 component, a MME 206 component, an OCS/OFCS 114 component, and an HSS 212 component. The SODD 210 component may be configured to communicate with each of the MME 206, PCRF 112, and HSS 212 components via direct or indirect communication links.

In operation 302 of method 300, the SODD 210 component may request and receive signaling information from the MME 206 component. Such signaling information may include the number of network connections in which no data was transmitted (i.e., signaling-only connections), the types or amounts of signaling or control plane information that has been communicated to and from a user equipment 102 device, and/or other information that is stored in or accessible to the MME 206 component. In operation 304, the SODD 210 component may request and receive data usage information from the OCS/OFCS 114 component. The data usage information may include the number of data connections, the amount of content or data plane information that has been communicated to and from the user equipment 102 device, and other similar information that is stored in or accessible to the OCS/OFCS 114 component. In operation 306, the SODD 210 component may request and receive subscription information pertaining to the user equipment 102 device from the HSS 212 component.

In an embodiment, the SODD 210 component may also request and receive connection information from the HSS 212 component as part of operation 306. By receiving the connection information from the HSS 212 component (as opposed to another node in the network), this embodiment reduces the number of nodes/components that are queried for information when determining whether the user equipment 102 device is a signaling-only device, thereby improving the efficiency of the system and reducing network traffic.

In operation 308, the SODD 210 component may compute the ratio between the number of connections in which no data was transmitted (signaling-only connections) and the number of connections in which data was transmitted (signaling and data connections). In optional operation 310, the SODD 210 component may decode or examine communication messages that are sent to initiate, establish, or setup a session (such as SIP, IMS, or SS7 messages) to determine whether they include additional information that is not required for the session-setup.

In operation 312, the SODD 210 component may determine whether the user equipment 102 device is a signaling-only device. For example, in operation 312, the SODD 210 component may determine whether the ratio computed in operation 308 falls within a normal operating range, and classify the user equipment 102 device as signaling-only device when the ratio does not fall within the normal operating range. As another example, the SODD 210 component may determine that the user equipment 102 device is a signaling-only device when it is determined in operation 310 that the communication message includes additional information that is not required for the session-setup.

In an embodiment, the SODD 210 component may determine that the user equipment 102 device is a signaling-only device based on parameters defined by the network operator. For example, the SODD 210 component may determine the number of signaling-only connections that were created consecutively by the user equipment 102 device, and compare the number of consecutive signaling-only connections to a parameter set by the network operator to determine whether the user equipment 102 device is a signaling-only device. The parameter may be set manually by the network operator or calculated automatically (e.g., as an average value from all non-signaling only devices in the previous month). As such, the determination of whether or not the user equipment 102 device is a signaling-only device may be operator dependent.

The SODD 210 component may be configured to perform any of a variety of operations in response to determining that a user equipment 102 device is a signaling-only device. For example, the SODD 210 component may interact with the various network components/nodes to modify the user equipment 102 device's access or use of the network. This may be accomplished by the SODD 210 component modifying subscription information stored in the HSS, SPR, HLR, VLR, and/or other similar components. The SODD 210 component may also notify the network operator that the user equipment 102 device is a signaling-only device so that the network operator may block or charge the user equipment 102 device for its use of the network. The SODD 210 component may also interact with the user equipment 102 device's owner/subscriber via notification system, GUI, or API to notify them that the device will be blocked or de-prioritized if they do not take corrective actions, such as by changing to a different subscription/billing plan. The SODD 210 component may also cause the user equipment 102 device or a network component to filter SIP messages, remove additional information from the messages, remove unknown headers from the messages, and/or remove headers that carry additional information from the messages. As another example of a responsive operation, the SODD 210 component may also apply a policy rule to signaling communications of the user equipment device in response to determining that the user equipment device is a signaling-only device. In various embodiments, the policy rule may be any business, technology, priority, access, usage, communication, authorization, control, or charging rule.

In an embodiment, the SODD 210 component may be configured to block the user equipment 102 device from connecting to the network when it determines that the user equipment 102 device is a signaling-only device. In an embodiment, the SODD 210 component may be configured to modify subscription information in the HSS 212 component to block connections between the network and the user equipment 102 device during certain times. By blocking connections during certain times, the SODD 210 component may prevent the user equipment 102 device from communicating payload information via time-based signaling. In an embodiment, the SODD 210 component may be configured to push the modified subscription information to the eNodeB 204 so that connections between the network and the user equipment 102 device may be blocked as early as possible.

In an embodiment, the SODD 210 component may be configured to cause one or more network components to implement signaling-based billing and/or charging rules for a user equipment 102 device determined to be a signaling-only device. For example, the SODD 210 component may send a notification message to an OCS/OFCS 114 component to cause it to charge a subscriber account associated with the user equipment 102 device for signaling messages sent to or from the user equipment 102 device.

In various embodiments, the SODD 210 component may be configured to cause one or more network components to generate or enforce a signaling-only device based policy (e.g., only applying minimal bandwidth to a bearer of a signaling-only device), set a low ARP or QCI for signaling-only devices, or perform other similar operations (e.g., not set-up a bearer for a signaling-only device, etc.).

In an embodiment, the network 200 may also include an M2M engagement engine (not illustrated) configured to enable the machine-to-machine service provider to associate two or more machine-to-machine devices together to form a machine-to-machine device group. The service provider may subsequently treat this device group as a single entity from a device management point of view. For example, a service provider that provides a vehicle tracking service may create device groups for each of emergency service vehicles (e.g., ambulances, fire brigades, etc.), corporate fleet vehicles, and private vehicles. The service provider may then incorporate these device groups into policies within the M2M engagement engine, e.g., the service provider may create a policy that prioritizes data received from the emergency service vehicle device group over the other device groups.

In an embodiment, the M2M engagement engine may be configured to send information identifying a device or communication group to which the user equipment device belongs to the SODD 210 component as signaling information. In an embodiment, the SODD 210 component may be configured to use group information to determine whether the user equipment device is a signaling-only device, or whether the communication group to which the user equipment device belongs is a signaling-only group.

Figure 4:
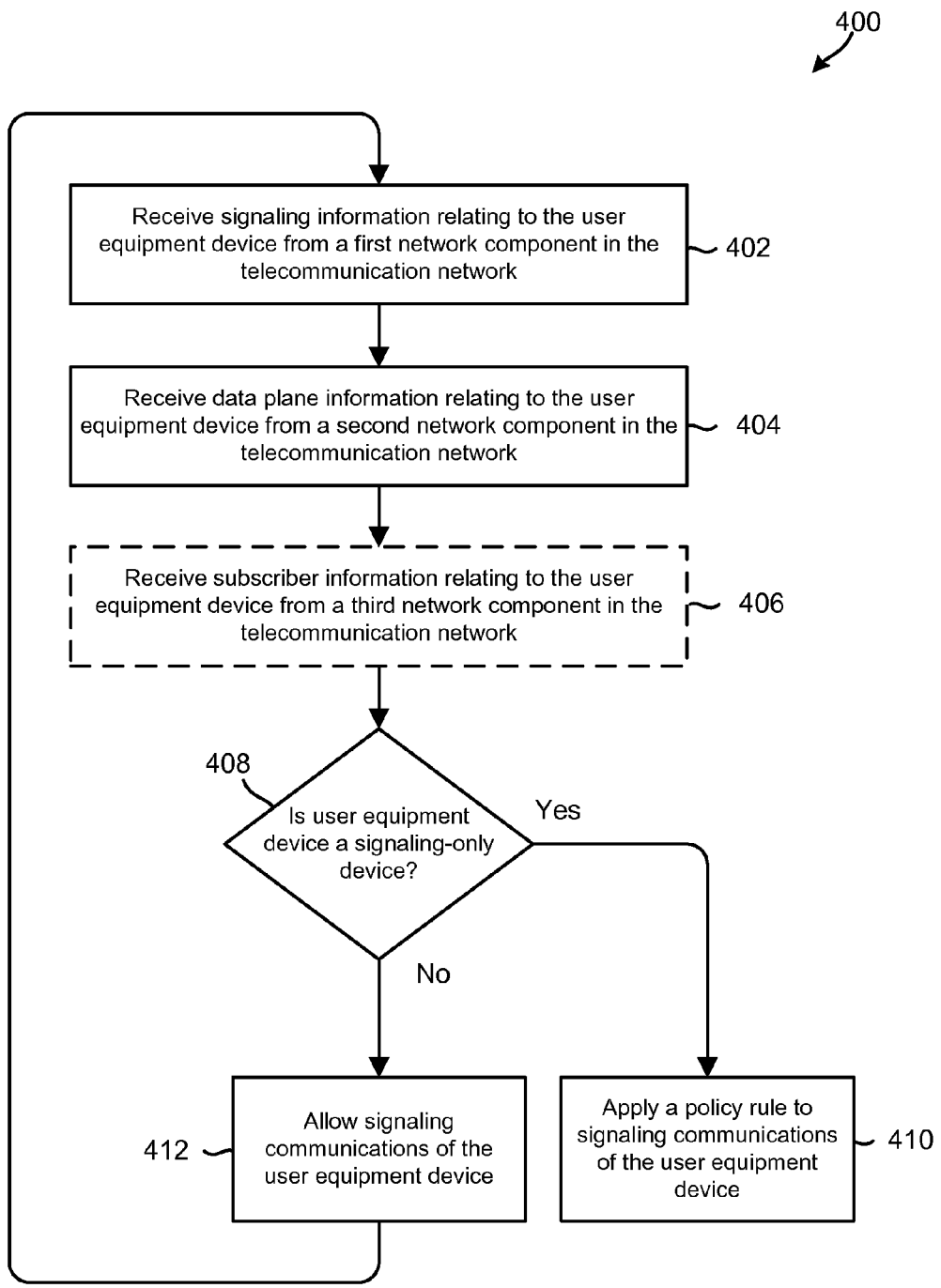
FIG. 4 is a process flow diagram illustrating an embodiment method of preventing a user equipment device from communicating payload information across a telecommunication network without sufficiently paying for the access or use of the network.

FIG. 4 illustrates an embodiment method 400 of preventing a user equipment device from communicating payload information in a telecommunication network without sufficiently paying for the communication. Embodiment method 400 may be performed by a processor in a server computing device deployed in the telecommunication network. In block 402, the server may request and receive signaling information relating to the user equipment device from a first network component in the telecommunication network. In an embodiment, the first network component may be a mobility management entity (MME) component. In various embodiments, the signaling information may include the number of network connections in which no data was transmitted (i.e., signaling-only connections), the types or amounts of signaling or control plane information that has been communicated to and from a user equipment device, charging or billing information, information regarding a direct or proxied signaling communication, information obtained by the MME via an application level protocol, information identifying a communication group of the user equipment device, and/or other similar information.

In block 404, the server may request and receive data plane information relating to the user equipment device from a second network component in the telecommunication network. In various embodiments, the second network component may be any one of an eNodeB, radio network controller (RNC), serving GPRS support node (SSGN), gateway GPRS support node (GGSN), serving gateway (SGW), packet data network gateway (PGW), policy charging rules function (PCRF) component, on-line charging system (OCS) component, and an offline charging system (OFCS) component. The data plane information may include data usage information, such as the number of data connections, the amount of content or data plane information that has been communicated to and from the user equipment device, and other similar information.

In optional block 406, the server may request and receive subscriber information relating to the user equipment device from a third network component in the telecommunication network. In various embodiments, the third network component may be a home subscriber server (HSS) or a subscriber profile repository (SPR) component. The subscription information may include location information (e.g., subscriber's city of residence, current location, etc.), IP information, data plan information (e.g., subscriber's service or priority level, etc.), subscriber identifiers, subscriber profile information (e.g., customer IDs, preferences, subscription levels, balances, etc.), user information, and other similar information.

In determination block 408, the server may determine whether the user equipment device is a signaling-only device based on the received signaling information and the received data plane information. For example, the server may compare the ratio of signaling only connections to signaling and data connections with the subscription information and/or conventional usage models to determine if the user equipment is a conventional device that is operating within normal usage patterns or generating an excessive number or amount of signaling communications. As another example, the server may determine whether a ratio between the number of signaling-only connections and the average monthly revenue associated with the user equipment device (or a M2M device group) is within normal usage patterns. In addition, the server may determine whether the signaling communication patterns are consistent with conventional usage patterns, whether the signaling communication messages include payload information or information that is not consistent with the signaling message type, etc.

When the server determines that the user equipment device is a signaling-only device (i.e., determination block 408="Yes"), in block 410, the server may apply a policy rule to signaling communications of the user equipment device in response to determining that the user equipment device is a signaling-only device. This may be accomplished by the server communicating with a with a mobile core network component (e.g., PCRF, PGW, GGSN, etc.), an SS7 component, or an IMS component to cause that component to generate and/or enforce a set of business, technology, priority, access, usage, and/or charging rules for the user equipment device for a particular time, communication, or session. For example, the server may cause the component to enforce a charging rule that charges the subscriber account associated with the user equipment device for the signaling communications, or denies it access based on the amount of fund/credits/access units available in the subscriber account. The server may also send a notification message to another component in the network to notify it that the user equipment device is a signaling-only device, store or log the identity information and other statistics of the signaling only device, notify the device owner, and perform other similar operations. When the server determines that the user equipment device is not a signaling-only device (i.e., determination block 408="No"), in block 412, the server may allow the signaling communications of the user equipment device to be communicated across the network using the existing network configuration, and the operations of blocks 402-408 may be repeated.

Figure 5:
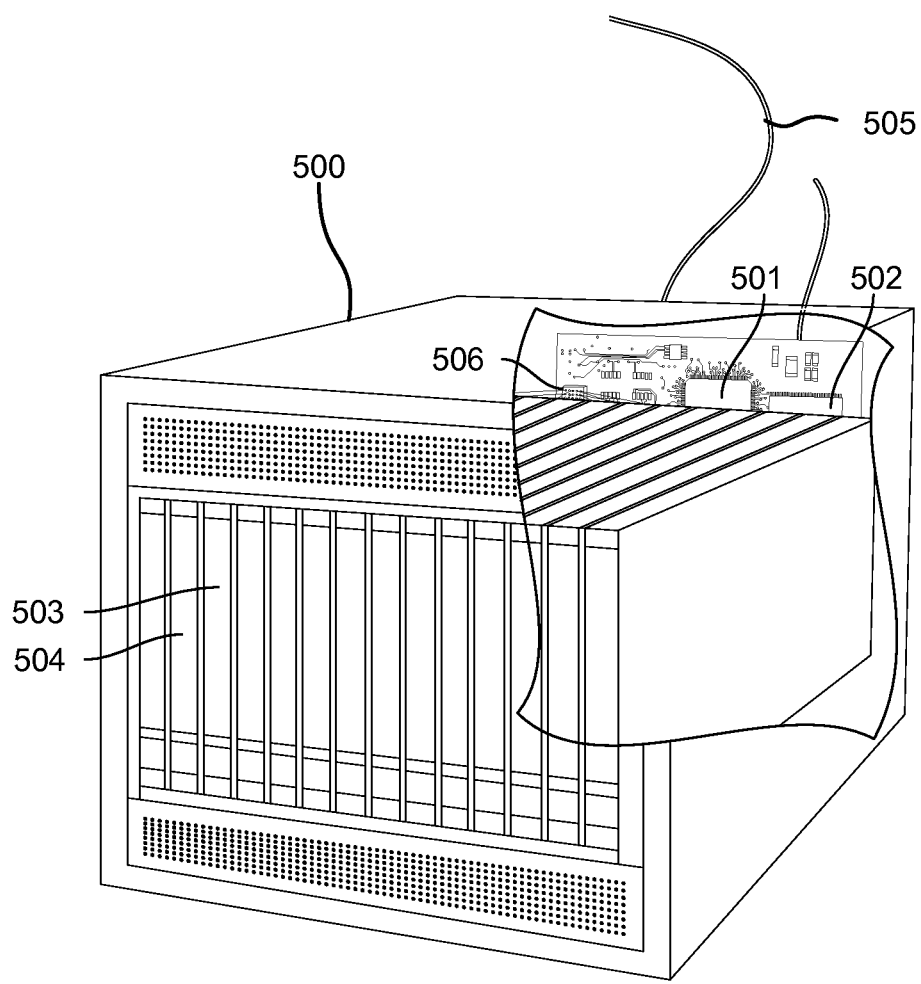
FIG. 5 is a component diagram of server suitable for use with the various embodiments.

The various embodiments may be implemented on any of a variety of commercially available server devices, such as the server 500 illustrated in FIG. 5. Such a server 500 typically includes a processor 501 coupled to volatile memory 502 and a large capacity nonvolatile memory, such as a disk drive 503. The server 500 may also include a floppy disc drive, compact disc (CD) or DVD disc drive 504 coupled to the processor 501. The server 500 may also include network access ports 506 coupled to the processor 501 for establishing data connections with a network 505, such as a local area network coupled to other operator network computers and servers.

The processor 501 may be any programmable microprocessor, microcomputer or multiple processor chip or chips that can be configured by software instructions (applications) to perform a variety of functions, including the functions of the various embodiments described below. Multiple processors 501 may be provided, such as one processor dedicated to wireless communication functions and one processor dedicated to running other applications. Typically, software applications may be stored in the internal memory 502, 503, before they are accessed and loaded into the processor 501. The processor 501 may include internal memory sufficient to store the application software instructions.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of preventing a user equipment device from communicating payload information in a telecommunication network without sufficiently paying for use of the telecommunication network, the method comprising:

receiving in a processor signaling information relating to the user equipment device from a first network component in the telecommunication network;

receiving data plane information relating to the user equipment device from a second network component in the telecommunication network;

using the received signaling information and the received data plane information to determine a number of times that the user equipment device established signaling-only connections within a time period;

determining an average amount of revenue associated with the user equipment device and the time period;

using the received signaling information to determine whether the user equipment device is a signaling-only device that uses signaling communications to circumvent paying for the use of the telecommunication network based on a ratio between the number of times that the user equipment device established signaling-only connections within the time period and the determined average amount of revenue; and performing a responsive operation in response to determining that the user equipment device is a signaling-only device.

2. The method of claim 1, wherein using the received signaling information to determine whether the user equipment device is a signaling-only device that uses signaling communications to circumvent paying for the use of the telecommunication network further comprises:

determining whether signaling information includes a signaling communication message that includes information that is not consistent with a signaling communication message type associated with the signaling communication message.

3. The method of claim 1, wherein using the received signaling information to determine whether the user equipment device is a signaling-only device that uses signaling communications to circumvent paying for the use of the telecommunication network further comprises:

determining whether signaling information includes payload information.

4. The method of claim 1, further comprising using the received signaling information to determine a communication group of the user equipment device.

5. The method of claim 4, wherein:

receiving data plane information for the communication group comprises receiving data plane information for a second user equipment device in the communication group; and determining whether the user equipment device is a signaling-only device based on the received signaling information and the received data plane information comprises determining whether the user equipment device is a signaling-only device based on signaling information associated with the user equipment device and data plane information associated with the second user equipment device.

6. The method of claim 1, wherein performing the responsive operation comprises:

applying one of a policy rule and a charging rule to signaling communications of the user equipment device in response to determining that the user equipment device is a signaling-only device.

7. A server computing device, comprising:

a processor configured with processor-executable instructions to perform operations comprising:

receiving signaling information relating to a user equipment device from a first network component in a telecommunication network;

receiving data plane information relating to the user equipment device from a second network component in the telecommunication network;

using the received signaling information and the received data plane information to determine a number of times that the user equipment device established signaling-only connections within a time period;

determining an average amount of revenue associated with the user equipment device and the time period;

using the received signaling information to determine whether the user equipment device is a signaling-only device that uses signaling communications to circumvent paying for the use of the telecommunication network based on a ratio between the number of times that the user equipment device established signaling-only connections within the time period and the determined average amount of revenue; and performing a responsive operation in response to determining that the user equipment device is a signaling-only device.

8. The server computing device of claim 7, wherein the processor is configured with processor-executable instructions to perform operations such that using the received signaling information to determine whether the user equipment device is a signaling-only device that uses signaling communications to circumvent paying for the use of the telecommunication network further comprises:

determining whether signaling information includes a signaling communication message that includes information that is not consistent with a signaling communication message type associated with the signaling communication message.

9. The server computing device of claim 7, wherein the processor is configured with processor-executable instructions to perform operations such that using the received signaling information to determine whether the user equipment device is a signaling-only device that uses signaling communications to circumvent paying for the use of the telecommunication network further comprises:

determining whether signaling information includes payload information.

10. The server computing device of claim 7, wherein the processor is configured with processor-executable instructions to perform operations further comprising using the received signaling information to determine a communication group of the user equipment device.

11. The server computing device of claim 10, wherein the processor is configured with processor-executable instructions to perform operations such that:

receiving data plane information for the communication group comprises receiving data plane information for a second user equipment device in the communication group; and determining whether the user equipment device is a signaling-only device based on the received signaling information and the received data plane information comprises determining whether the user equipment device is a signaling-only device based on signaling information associated with the user equipment device and data plane information associated with the second user equipment device.

12. The server computing device of claim 7, wherein the processor is configured with processor-executable instructions to perform operations such that performing the responsive operation comprises:

applying one of a policy rule and a charging rule to signaling communications of the user equipment device in response to determining that the user equipment device is a signaling-only device.

13. A non-transitory computer readable storage medium having stored thereon processor-executable software instructions configured to cause a processor to perform operations comprising:

receiving signaling information relating to a user equipment device from a first network component in a telecommunication network;

receiving data plane information relating to the user equipment device from a second network component in the telecommunication network;

using the received signaling information and the received data plane information to determine a number of times that the user equipment device established signaling-only connections within a time period;

determining an average amount of revenue associated with the user equipment device and the time period;

using the received signaling information to determine whether the user equipment device is a signaling-only device that uses signaling communications to circumvent paying for the use of the telecommunication network based on a ratio between the number of times that the user equipment device established signaling-only connections within the time period and the determined average amount of revenue; and performing a responsive operation in response to determining that the user equipment device is a signaling-only device.

14. The non-transitory computer readable storage medium of claim 13, wherein the stored processor-executable software instructions are configured to cause a processor to perform operations such that using the received signaling information to determine whether the user equipment device is a signaling-only device that uses signaling communications to circumvent paying for the use of the telecommunication network further comprises:

determining whether signaling information includes a signaling communication message that includes information that is not consistent with a signaling communication message type associated with the signaling communication message.

15. The non-transitory computer readable storage medium of claim 13, wherein the stored processor-executable software instructions are configured to cause a processor to perform operations such that using the received signaling information to determine whether the user equipment device is a signaling-only device that uses signaling communications to circumvent paying for the use of the telecommunication network further comprises:

determining whether signaling information includes payload information.

16. The non-transitory computer readable storage medium of claim 13, wherein the stored processor-executable software instructions are configured to cause a processor to perform operations further comprising using the received signaling information to determine a communication group of the user equipment device.

17. The non-transitory computer readable storage medium of claim 16, wherein the stored processor-executable software instructions are configured to cause a processor to perform operations such that:

receiving data plane information for the communication group comprises receiving data plane information for a second user equipment device in the communication group; and determining whether the user equipment device is a signaling-only device based on the received signaling information and the received data plane information comprises determining whether the user equipment device is a signaling-only device based on signaling information associated with the user equipment device and data plane information associated with the second user equipment device.

18. The non-transitory computer readable storage medium of claim 13, wherein the stored processor-executable software instructions are configured to cause a processor to perform operations such that performing the responsive operation comprises:

applying one of a policy rule and a charging rule to signaling communications of the user equipment device in response to determining that the user equipment device is a signaling-only device.

* * * * *